United States Patent Office 3,234,825
Patented Feb. 15, 1966

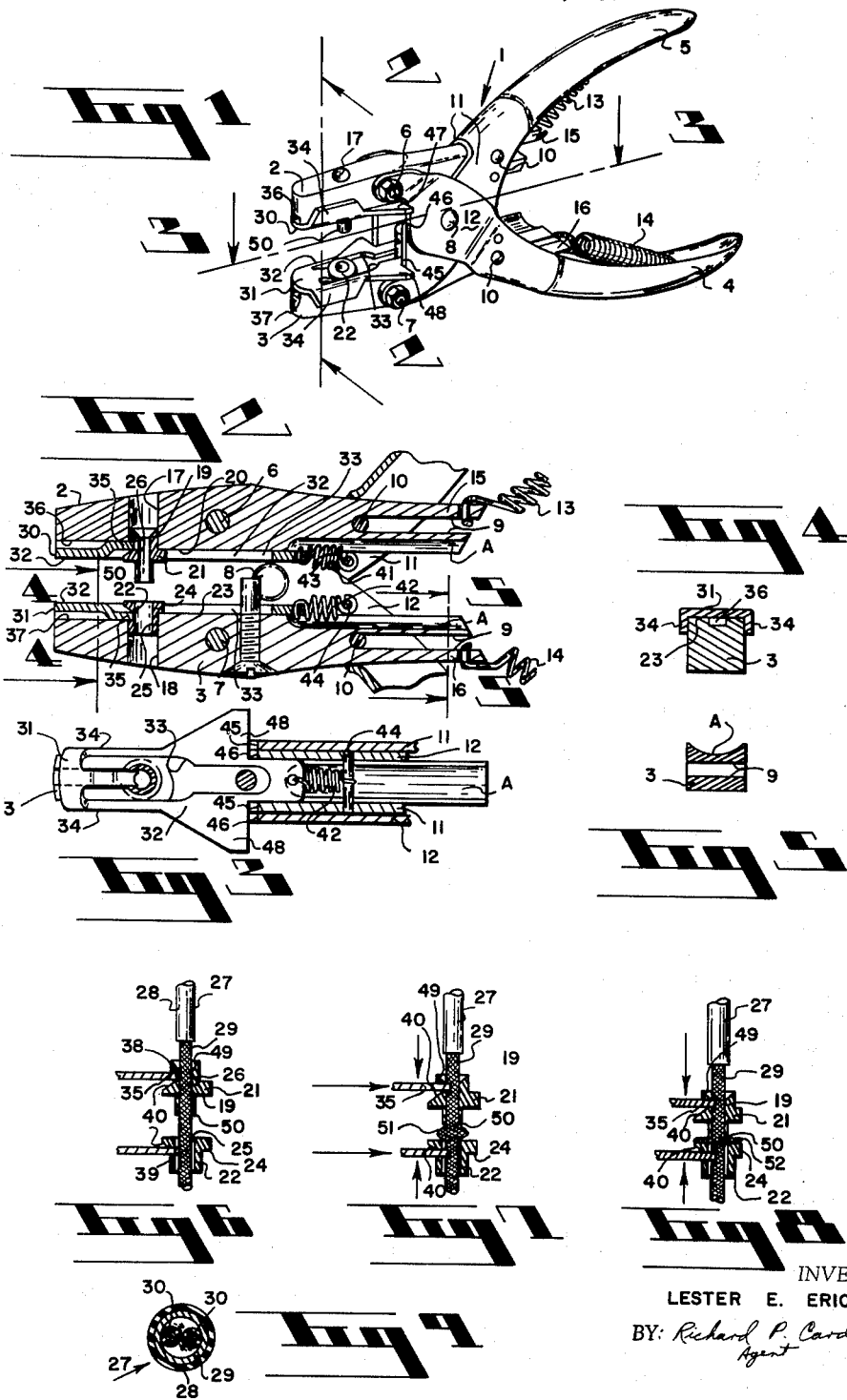

3,234,825
TOOL FOR STRIPPING METAL BRAID SHIELDING FROM INSULATED CABLE
Lester E. Erickson, 320 Medin Road, Duluth, Minn.
Filed Feb. 19, 1964, Ser. No. 345,995
5 Claims. (Cl. 81—9.5)

This invention relates to a device for stripping metal braid shielding from shielded wire or cable, such as is used in many applications in electronic equipment.

There has long been a search for a tool, which is simple in operation and simple in construction, for removing metal braid shielding from insulated wire or cable. This type of cable has been used for many years in electronics work, and the job of stripping has always been a problem, especially in factories where volume production is required. Stripping devices heretofore known have all had deficiencies which limited their capacity to produce, or which caused various undesirable results during operation. Some devices often cause insulation, or the wire itself, to be damaged during the operation of the stripper. Others could not provide a smooth cutting of the shielding so that it was difficult to install the wire properly after it was stripped. Others were too complicated or cumbersome to use in production work, and still others could not be operated fast enough to make them worthwhile to use. Still others were limited as to their versatility in providing for different lengths of stripping.

It is, therefore, one of the primary objects of this invention to provide a simple, easy to use tool for stripping metal braid shielding from insulated wire or cable.

Another object is to provide such a tool which will permit the removing of metal braid sheathing to any desired length with no change required in the tool itself.

Another object is to provide a tool to remove metal braid shielding which will provide a clean, neat cut of the shielding so that the cut end is ready to receive the next operation without further attention from a worker.

Another object is to provide such a tool which will not damage the insulation or the conductors of a cable during the stripping operation.

Another object of this invention is to provide a metal braid shielding stripper which is capable of stripping large numbers of cables quickly and efficiently.

Another object is to provide such a stripping tool that can be operated by unskilled workers.

A more specific object of this invention is to provide a plier-type tool for stripping metal braid shielding from insulated cable which carries a male and a female die for cutting the shielding cleanly in the desired location each time it is operated.

Another specific object is to provide a plier-type tool with a pair of jaws, one jaw carrying the male die, the other carrying the female die, and means to move the dies into cutting engagement with each other, the dies having alined axial openings therethrough through which the shielding to be stripped extends during the cutting operation.

Another specific object of the invention is to provide such a jaw and die equipped tool with automatically operated and guided gripper means for holding the shielding during the cutting operation so that as the jaws are moved, the metal braid shielding is bulged between the dies and can be cut off cleanly and smoothly as the dies are brought together.

Another specific object is to provide gripping means for such a stripping tool that which are provided with spring tensioning means for moving the gripping means into position to hold the shielding and cable, and for applying a predetermined tension or gripping effort which is sufficient to hold the shielding as required for bulging and cutting, but will not cause damage to the cable or its insulation or conductors during the operation.

Another object is to provide such a plier-type tool of the parallel-jaw type so that the cable being cut will not be bent as the jaws are moved to die engagement.

These and other objects and advantages of the present invention will become more apparent as the description proceeds.

In the accompanying drawing forming a part of this application:

FIG. 1 is a perspective view of a tool embodying my invention.

FIG. 2 is a central longitudinal sectional view on the line 2—2, FIG. 1.

FIG. 3 is a fragmental sectional view on the line 3—3, FIG. 1, showing the female die in section to illustrate the gripper more clearly.

FIG. 4 is a sectional view on the line 4—4, FIG. 2.

FIG. 5 is a sectional view on the line 5—5, FIG. 2.

FIG. 6 is a central sectional view of the dies for cutting braided wire shielded cable with the cable in place for beginning the stripping operation.

FIG. 7 is a view similar to FIG. 6 with the dies moved closer together to show how the braided wire shielding bulges for cutting.

FIG. 8 is a view similar to FIG. 7 with the dies moved still closer together to show their relationship just prior to the actual cutting of the shielding.

FIG. 9 is a sectional view through a piece of cable having two conductors and a braided wire shield.

In the drawing the reference numeral 1 indicates generally a pair of parallel-jaw type pliers equipped with my invention. The pliers 1 includes a pair of similar jaws, which will be referred to as the upper jaw 2 and the lower jaw 3 for simplicity in describing the invention. The jaws 2 and 3 are operated by means of handles 4 and 5 which are pivotally connected to their respective jaws as at 6 and 7, and are pivotally connected together as at 8. To maintain parallel relationship of the jaws as they move toward and away from each other, each of the jaws is provided with a longitudinal guide slot 9—9 and a guide pin 10—10 which is fixed to the respective handle 4 and 5 and extends through the slots 9—9 as shown. The jaws are additionally guided by means of the bifurcated portions 11—11 and 12—12 of the jaws so that they are maintained in proper operating condition as the handles are moved toward and away from each other. Springs 13 and 14 are connected to each of the handles 4 and 5 and to the inner ends 15 and 16 of the jaws to maintain the jaws in open position as shown in FIG. 1 so that the jaws may be moved together by manually squeezing the handles toward each other, and the jaws will open as squeezing pressure is released, making for one hand operation of the device. All of this structure and operation are old in the art and is found on parallel-jaw pliers now available on the market.

In my invention, I provide each of the jaws 2 and 3 with a die receiving opening 17 and 18 which extends through the jaws in line with the direction of movement of the jaws, as shown. A male die 19 is installed in the opening 17 on the inner face 20 of the upper jaw 2 and is seated by a flange or shoulder 21 on the die which engages the inner face 20 of the jaw as shown. The female die 22 is installed in the opening 18 on the inner face 23 of the lower jaw 3 and has a shoulder or flange 24 to seat it firmly on the inner face 23 as shown.

The male die is of a size to fit into the opening 25 in the female die for proper cutting in conjunction with the female die.

The dies 19 and 22 have alined cable receiving openings 26 and 25 respectively axially thereof to receive a section of insulated metal braided shielded cable 27 therethrough as shown in FIGS. 6, 7 and 8, the cable 27 having an insulating covering 28 which is usually pre-stripped from the cable before the metal braided shield 29 is stopped by the device of the present invention. One or more conductors 30 of the cable are carried within the shielding as shown in FIG. 9.

A pair of similar gripper members 30 and 31 are carried on the upper and lower jaws respectively, as shown. Each gripper member has an elongated body portion 32 which has an elongated slot or opening 33 therein to permit the gripper members to be carried against the faces 20 and 23 of the jaws and to be moved longitudinally thereon without interference from or with the dies 19 and 22 as the openings 33 are slightly larger than the flanges or shoulders on the dies as shown. The gripper members also have side portions 34—34 which are bent so as to extend along the sides of their respective jaw members to act as guides to hold the gripper members in proper alinement on their jaws as the gripper members are moved longitudinally on the jaws, the purpose of which will become apparent.

Each of the gripper members 30 and 31 is provided with a gripping lip 35 which is offset from the body portion and extends into the slot or groove 36 and 37 provided in the jaws 2 and 3, respectively, parallel with the direction of movement of the gripper members as shown. Each of the dies 19 and 22 has a radial opening 38 and 39, respectively, to receive the gripping lip 35 and to permit the latter to enter into the die openings 26 and 25 to engage and grip or hold the metal braided shield 29 against movement in the openings 26 and 25 when the device is in operation. As shown in the drawings, the openings 38 and 39 preferably have a sloping entrance 40 for the lip 35 to insure the lips 35—35 making a smooth entrance into the dies to perform their desired function.

The gripper members 30 and 31 are biased toward keeping the lips 35 within their respective die openings by springs 41 and 42, one end of the springs being attached to its particular gripper member, and the other end of the springs being attached to a suitable anchor, such as the pins 43 and 44 in the handles 5 and 4, respectively. The jaw members 2 and 3 are cut away as at A to receive the springs 41 and 42.

The grippers are moved against the bias of the springs by means of cam surfaces or areas 45 and 46 on the handle members 11 and 12 which engage the lugs 47 and 48 which project outwardly from the body portion of the gripper members.

As is clearly seen in FIGS. 1 and 2, the cam surfaces 45 and 46 engage the lugs 46 and 47 when the plier operating handles 4 and 5 are in open or extended position and hold the gripper members 30 and 31 in an outward position, or in other words, in such a position that the lugs 35 do not extend into the aligned openings 25 and 26 and the latter openings are free of obstruction so that the cable 27 may be inserted into the alined openings for the stripping operation. The cable 27 is preferably inserted through the male die first as shown in FIGS. 6, 7 and 8, the male die having a cone shaped entrance 49 to facilitate inserting the cable, it being apparent that the male die opening 26 is smaller than the female die opening 25, as shown, so that the cutting end 50 of the male die will fit into the opening 25 in the female die for proper cutting of the metal braided sheath 29.

In operation, a cable is inserted through the dies as above described to the desired distance, and the handles 4 and 5 are squeezed together. As the handles are moved together, the cam surfaces 45 and 46 permit the gripper members 30 and 31 to move inwardly, or, in other words, in a direction whereby the gripper lips 35—35 move into their respective die openings and engage the cable. The springs 41 and 42 apply a predetermined tension to the gripper members whereby the lips 35—35 engage and apply pressure against the cable 27 to a predetermined degree which is sufficient to prevent movement of the cable 27 longitudinally of the cable receiving openings 25 and 26, but not sufficient to injure or damage the metal braided shielding 29 or the conductors 30—30 therein. As seen in FIG. 3, the cam surfaces 45 and 46 preferably do not engage the lugs 47 and 48 when the gripper members are in their inwardmost position which position is reached before the handles are moved to their limit.

As the handles are squeezed together, first the gripper lips 35—35 engage and hold the shield 29 as above described, then the metal braided shield 29 starts to bulge as at 51 in FIG. 7 as the jaws 2 and 3 and their dies move toward each other.

As the dies 19 and 22 come to engagement the shield 29 is flattened as at 52, FIG. 8, and is cut cleanly as the male die starts into the female die, leaving a clean, neat, uniform cut end on the shielding without loose uncut wires to form a jagged end, and without marring or distorting the shield above the cut nor damaging the conductors 30—30 in any way.

As soon as the cut is made, the grip or squeeze on the handles 4 and 5 may be released and the springs 13 and 14 will return the plier to open position, and the gripper lips 35 will release the cable 27 so it can be removed from the cable openings, ready for its next operation.

What I claim is:

1. In combination with a plier having a pair of movable jaws, means for stripping metal braided shielding and the like from cables comprising:

a male die on one of said jaws, a female die on the other of said jaws, said dies having alined substantially axial openings through which said cable extends to be stripped, reciprocable gripping means carried by each jaw and having a gripper portion adapted to extend into said alined openings, a spring means biasing each of said gripper means into its respective one of said alined openings to provide a predetermined gripping pressure at predetermined spaced points on a cable in said openings whereby as said jaws are closed the said metal braided shielding is held against slipping in said alined openings and is forced to form an annular bulge between said male and female dies permitting said dies to sever the said shielding at the bulge as said dies engage, and cam means operated as said jaws are moved away from each other to move said gripper means out of said openings against the bias of said spring means, said cam means including a cam surface carried by each of said gripping means and a cooperating cam surface carried by portions of said jaws and operated by movement of said jaws to control the action of said gripping means.

2. In combination with a plier having a pair of movable jaws, means for stripping metal braided shielding and the like from cables comprising:

a male die on one of said jaws, a female die on the other of said jaws, said dies having alined substantially axial openings through which said cable is extended to be stripped and a radial opening through one wall of each of said dies communicating with said axial openings in its respective die, gripping means carried by each jaw and having a gripper lip adapted to extend into said radial opening of its respective die, spring means biasing said gripper lips through said radial openings and into said alined openings to engage and apply a predetermined holding pressure to a cable carried in said alined openings to prevent said cable from moving when so engaged whereby said braided metal shielding will be caused to bulge as said jaws are moved toward each other and said shielding will be cut off at the bulge by cooperative action of said dies as they meet, and cam means carried by portions of said movable jaws and operated as said jaws are moved away from each other to engage portions of said gripping means to move said gripper lips out of said alined openings to release said cable for removal from said alined openings.

3. In combination with a plier having a pair of movable jaws, and a pair of operating handles, means for stripping metal braided shielding and the like from cables comprising:

a male die on one of said jaws, a female die on the other of said jaws, said dies having alined substantially axial openings through which said cable is extended to be stripped and a radial opening through one wall of each of said dies communicating with said axial openings in its respective die, gripping means carried by each jaw and having a gripper lip adapted to extend into said radial opening of its respective die, said gripping means having a cam engaging lug extending therefrom, spring means biasing said gripper lips through said radial openings and into said alined openings to engage and apply a predetermined holding pressure to a cable carried in said alined openings to prevent said cable from moving when so engaged whereby said braided metal shielding will be caused to bulge as said jaws are moved towards each other and said shielding will be cut off at the bulge by cooperative action of said dies as they meet, and cam means operable as said jaws are moved away from each other to cause said gripper lips to release said cable for removal from said alined openings, said cam means being carried by said handle means and adapted to engage said lug on said gripper means for moving said gripper lips against the bias of said spring means.

4. In a device for stripping metal braid shielding and the like from insulated cable:

a pair of jaws, means for moving said jaws toward and away from each other, a male die on one of said jaws, a female die on the other of said jaws, said dies being mounted in alined relationship and having alined openings therethrough through which said cable is extended for stripping, cable gripper means carried by each of said jaws, said gripper means being movable so as to be extendable into and out of said alined openings in said dies to grip or release a cable extended into said openings, spring means biasing said gripper means into said alined openings to engage and apply a predetermined holding pressure at predetermined spaced points to a cable carried in said alined openings to prevent said cable from moving when so engaged whereby said braided shielding will be caused to bulge between said dies as said jaws are moved toward each other and said shielding will be cut off at the bulge by cooperative action of said dies as they meet, and means operated as said jaws are moved away from each other to cause said gripping means to disengage their hold on said cable so the latter may be withdrawn from said alined openings after the cutting operation.

5. In a device for stripping metal braid shielding and the like from insulated cable:

a pair of jaws, means for moving said jaws toward and away from each other, a male die on one of said jaws, a female die on the other of said jaws, said dies being mounted in alined relationship and having alined openings therethrough through which said cable is extended for stripping and having radial openings through one wall of each of said dies communicating with said alined openings, cable gripper means carried by each of said jaws and having a gripper lip adapted to move through said radial openings into said alined openings, said gripper lips being movable so as to extend into and out of said alined openings in said dies to grip or release a cable extended into said openings, spring means biasing said gripper means through said radial openings and into said alined openings to engage and apply a predetermined holding pressure at predetermined spaced points to a cable carried in said alined openings to prevent said cable from moving when so engaged whereby said braided shielding will be caused to bulge between said dies as said jaws are moved toward each other and said shielding will be cut off at the bulge by cooperative action of said dies as they meet, and cam means operated as said jaws are moved away from each other to cause said gripping means to disengage their hold on said cable so the latter may be withdrawn from said alined openings after the cutting operation.

References Cited by the Examiner

UNITED STATES PATENTS 3,044,333   7/1962   Broske.
3,139,778   7/1964   Bielinski et al.
3,153,358   10/1964  Havens.

WILLIAM FELDMAN, *Primary Examiner.*

MILTON S. MEHR, *Examiner.*